Feb. 14, 1933.　　　　M. G. REES　　　　1,897,074
INERTIA RELAY
Filed Jan. 14, 1932　　　2 Sheets-Sheet 1

INVENTOR
Mackworth G. Rees,
BY
ATTORNEYS

Feb. 14, 1933.  M. G. REES  1,897,074
INERTIA RELAY
Filed Jan. 14, 1932   2 Sheets-Sheet 2

INVENTOR
Mackworth G. Rees,
BY
ATTORNEYS

Patented Feb. 14, 1933

1,897,074

UNITED STATES PATENT OFFICE

MACKWORTH G. REES, OF DETROIT, MICHIGAN

INERTIA RELAY

Application filed January 14, 1932. Serial No. 586,545.

The present invention pertains to a novel inertia relay or switch designed to introduce certain operations or effects on the occurrence of certain changes in the speed of a moving member. With this object in view, the device is in the nature of an automatic switch but differs from the conventional devices of this character in that its functioning is determined by the relative variation in the speeds of a driving and a driven member during speed changes.

In one embodiment of the invention the driven member carries a fan, and is in frictional contact with the driving member. The ratio between driving member and driven member is relatively great. The frictional contact between driving and driven members is adjustable by means of a spring. The power available to drive the fan therefore is determined by this friction between the driving and driven members. It will be seen that an initial movement of the driving member will cause rotation of the driven member, and since the power taken by a fan is proportioned to the cube of its speed, the fan load will build up rapidly with acceleration and decrease rapidly with deceleration. As this load builds up, the tendency will be for the axis of the driven member to move in the direction of rotation of the driving member. This tendency is used to cause displacement of an arm to which switch members are secured. The switch members may in turn be used to set up electrical circuits to cause changes in the power conditions of the driving member, start auxiliary apparatus or flash signals.

Another embodiment of the invention involves the use of a flywheel as the driven member. Because of the energy stored in the flywheel when rotating, it does not immediately respond to abrupt changes in speed of the driving member but tends to maintain its rotational speed. Under such conditions it is apparent that the flywheel axis will tend to move along the face of the driving member in a direction dependent on the direction of change of the driving member speed. This tendency is used to cause the arm to which the flywheel is mounted to close or open contact members which in turn may perform any of the functions previously described.

Such a device is responsive principally to abrupt changes in acceleration or deceleration of the driving member while gradual changes will maintain the flywheel in a neutral or constant position. The flywheel effect may also be incorporated in the fan construction to obtain characteristics which will suitably combine those previously described and result in a device which will be sensitive to abrupt changes in speed of the driving member and may also be adjusted to be sensitive to a gradual speed change at a critical point.

Various uses for such an apparatus will readily suggest themselves to persons skilled in the art. Generally, the device is adapted to close or open electrical contacts immediately the driving member is started in motion, to maintain the contacts open or closed while the motion persists, to open or close the contacts when a state of motion is changed to a state of rest, to open or close the contacts at a given point in an accelerating or decelerating speed cycle, and to open or close the contacts when acceleration or deceleration in the driving motor occurs. Obviously, two sets of contacts may be provided, one for increased speed and the other for decreased speed, and these may be utilized for the operation of other apparatus such as that already indicated in a general way and those which will be more fully mentioned hereinafter.

The invention is fully disclosed by way of example in the following description and in the accompanying drawings in which—

Reference to these views will now be had by use of like characters which are employed to designate corresponding parts throughout.

Figure 2:
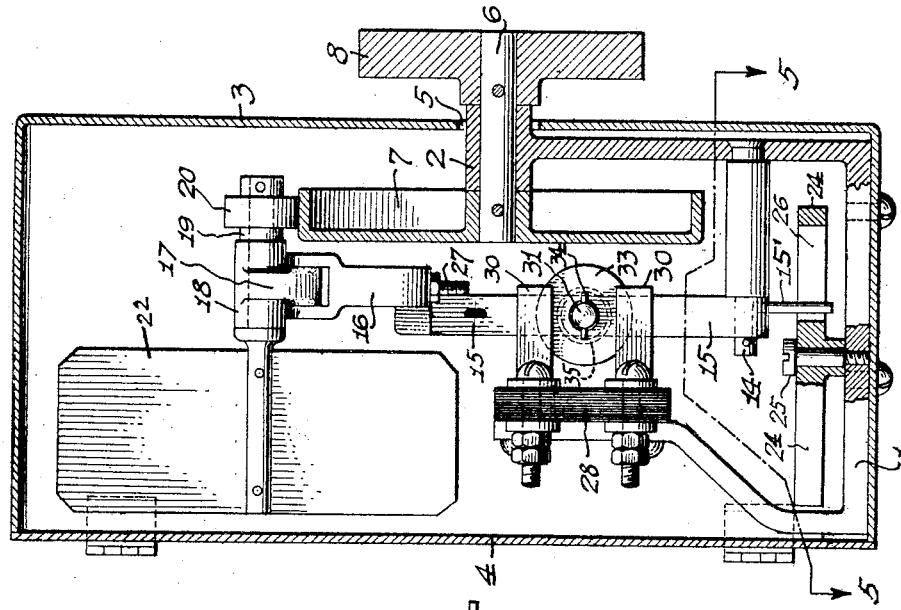
Fig. 2 is a vertical elevation, partly in section, at right angles to Fig. 1.

As shown more clearly in Fig. 2, the device herein illustrated is built upon a base bracket 1 of U-shape and having a horizontal bearing 2 formed at the upper end of one of its legs. The apparatus is preferably enclosed in a housing 3, and accordingly the bottom of the bracket 1 is secured to the bottom of the housing. The housing has a hinged side 4 for access to the interior. The bearing 3 extends through a hole 5 in the side of the housing for a purpose which will presently appear.

Figure 6:
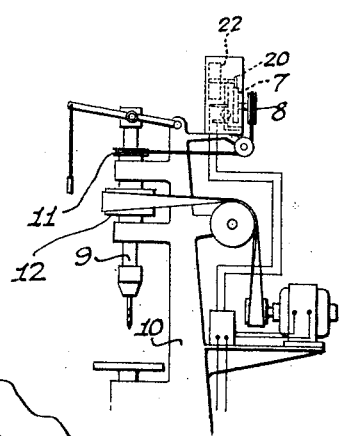
Fig. 6 is an elevation of a drill press equipped with a device according to the invention.
Figure 5:
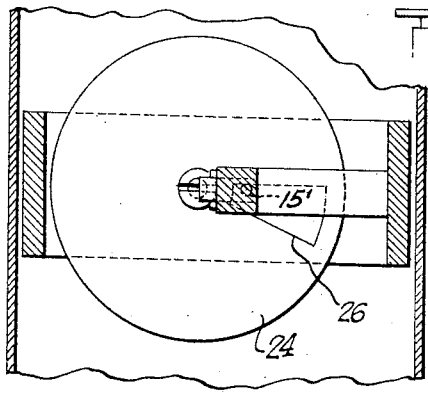
Fig. 5 is a section on the line 5—5 of Fig. 2.

The bearing 3 supports a shaft 6 which carries a disk or driving member 7 disposed within the housing. The outer end of the shaft carries a pulley 8 for connecting the shaft to a rotary member, the driving of which is to be controlled. In the assembly shown in Fig. 6, the member to be controlled is the spindle 9 of a drill press 10. The power driven sleeve 12 of the drill press carries another pulley 11 which is connected to the pulley 8 by a belt 13.

A stub shaft 14 extends inwardly from one of the sides of the bracket 1 and has a rocker arm 15 pivotally mounted thereon for a purpose which will presently appear. The arm has a laterally offset portion 16 at its upper end, and to this portion is pivotally attached a finger 17 formed at its free end with a bearing 18. The bearing supports a rotatable shaft 19 carrying a driven member 20 in the nature of a pulley having frictional contact with the periphery of the driving member 7. The member 20 preferably has a friction face and is held in contact with the driving member 7 by a spring 21 connecting the finger 17 to the offset portion 16, although any other suitable means may be employed for establishing a driving relation between the parts 7 and 20. The shaft 19 also carries a fan 22 for a purpose which will presently be described. Swinging of the arm in either direction is resisted by springs 23 extending therefrom in opposite directions and anchored to opposite walls of the housing 3 through the medium of spring adjusting devices 23′.

Below the arm a member 24 having relatively great inertia is pivotally mounted on the bracket 1 by a stud 25. The arm has a slot 26 which receives the reduced lower end 15′ of the arm. Any tendency of the arm to swing on its pivot shaft 14 is resisted and partially offset by the inertia of the member 24.

One of the sides of the U-shaped bracket 1 carries a block 28 of insulating material, and on this block are mounted two pairs of spaced switch contacts 29 and 30 at opposite sides of the arm 15. The arm carries a double contact member consisting of a stem 31 having contact discs 33 slidably mounted thereon near the ends. The discs are held against studs 34 on the stem by means of springs 34′ bearing against opposite edges of the arm 15.

Figure 1:
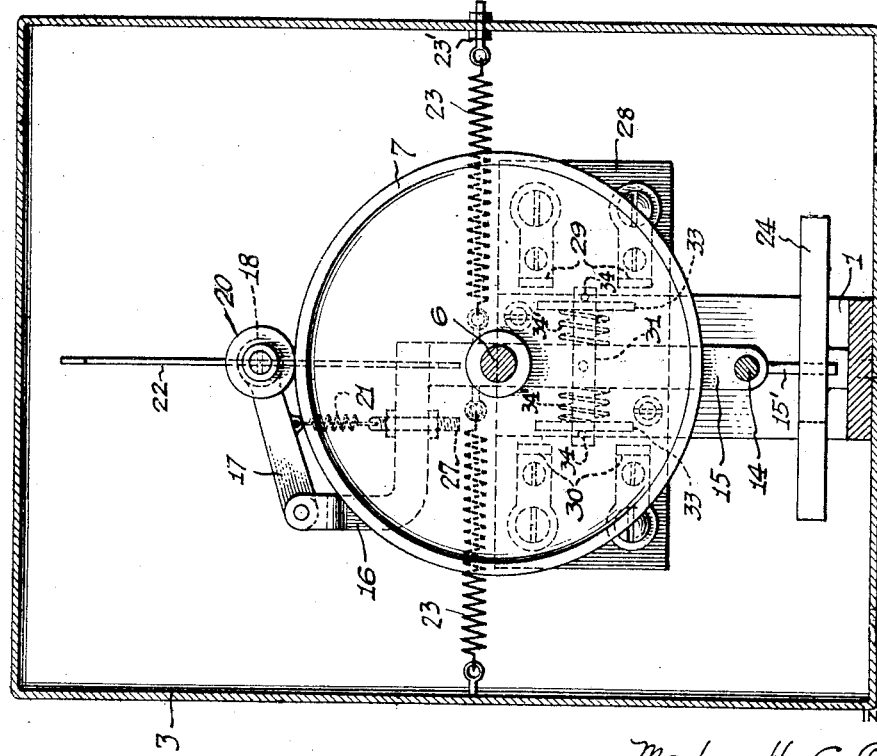
Figure 1 is a front elevation of the device, showing the housing thereof in section.

In the operation of the device, let it be assumed that the driving member 7 is turned in a clockwise direction as viewed in Fig. 1. On starting, the member 20 has a tendency to be initially dragged in a clockwise direction, and the member 20 and the fan 22 have a tendency to rotate in a counter-clockwise direction dependent on the friction supplied by adjustment of spring 21 and retarding tension supplied by adjustment of springs 23. The drag supplied to member 20 being constant, dependent on the adjustment of spring 21, the speed at which the fan load is great enough to cause a movement of member 20 will be dependent on the tension of the particular spring 23 resisting the movement, the other spring being slack and inoperative. Obviously above this critical speed, since the load required by the fan is proportional to the cube of its speed, the right hand contact member 33 will be held in engagement with the contact 29. Inasmuch as both aforementioned springs are adjustable, the device may be adjusted to hold the contact members in engagement above any desired speed. Increased speed of the fan merely increases the load required to drive it, thus holding the contacts more firmly in engagement.

Contacts 29 and 30 may be regarded for illustration as forming part of an electrical circuit where it is desired to use the device to slow down and stop a motor driven tool or machine by means of reverse power instead of using a brake. It is desired, however, to disconnect the reverse power when zero speed is reached so that actual reversal will not occur. Therefore when it is desired to stop a machine in this manner the forward power is disconnected and the reverse power applied. As before mentioned the contacts 29 complete the reverse power circuit so that by adjustment of springs 23, contacts 29 may be caused to open at a period of the decelerating cycle of the apparatus, thereby disconnecting the reverse power and preventing actual reversal of the apparatus.

Contacts 29 may also be regarded as forming part of an electrical circuit which may be completed only when the device is operating above a predetermined speed, so that this condition may be utilized to interlock subsequent apparatus in a sequence operation or energize suitable indicating signals to visualize operation at a remote point.

Conversely contacts 30 which are in engagement with the left hand contact member 33 when the device has decelerated to the point determined by the adjustment of springs 23, may be used for visual signalling to indicate conditions in the driven apparatus or may be used for electrically locking out other apparatus or for other similar uses where an electrical contact of the type is required.

Figure 3:
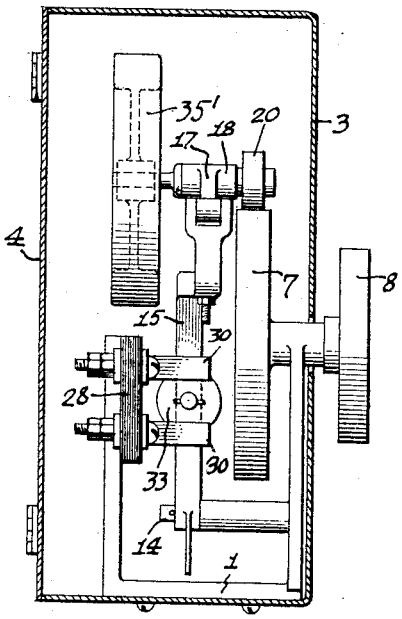
Fig. 3 is a vertical elevation of a modified construction employing a flywheel instead of a fan.

In the modification shown in Fig. 3, the fan 22 is replaced by a flywheel 35. This device is constructed to respond more particularly to comparatively rapid acceleration and deceleration. It is preferably adjusted so that the movable contacts thereof are in neutral or in open position when the member 7 does not exceed a predetermined acceleration or deceleration. When there is a pronounced change in the speed of the driving member 7, the driven flywheel 35 does not change its speed simultaneously because of its momentum, and this overrunning or lagging of the flywheel, as the case may be, causes one or the other of the pairs of contacts to be closed. For example, assuming again that the member 7 turns clockwise, a sharp acceleration thereof is not immediately taken up by the flywheel, whereupon the latter lags behind and closes the pair of contacts at the right. In like manner, a sudden deceleration of the driving member 7 is not immediately transmitted to the flywheel, but the latter rather tends to maintain its previous speed, because of its momentum, and causes closing of the contacts at the left hand side. A slow or gradual acceleration or deceleration, however, may not cause displacement of the flywheel to the extent of closing either switch, and the device may be adjusted for the maximum change of rate to be permitted without closing a switch. The opposed switches may obviously be adapted to introduce certain desired modifications in the power supply or the operation of auxiliary apparatus or signals on the attainment of a given acceleration or deceleration.

Figure 4:
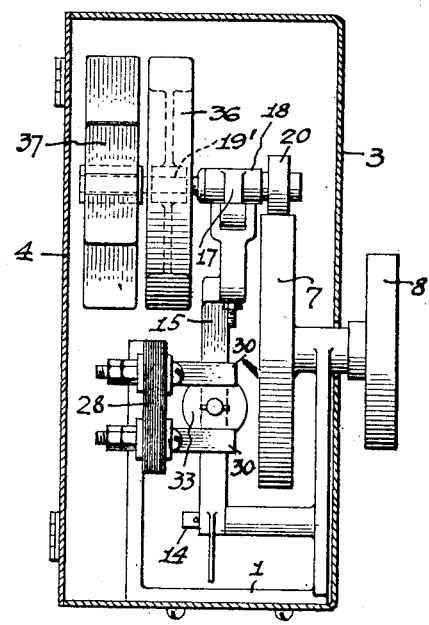
Fig. 4 is an elevation of another modified construction wherein both a fan and flywheel are used.

In the modification shown in Fig. 4 the shaft 19 carries both a flywheel 36 and fan 37. It is obvious that flywheel characteristics also may be embodied in the fan construction to obtain the same results. Such a device combines the characteristics of the types shown in Figs. 1 and 3 in that the flywheel effect will cause response to sharp changes in deceleration and the fan characteristics will allow for adjustments of springs 23 to close and open the contact members at some critical speed as previously mentioned.

In the oscillation of the arm 15, it will be evident that a pressure of the arm extension 15' against the edge of the slot 26 in the inertia member 24 will cause it to rotate, and with the device being driven with gradual acceleration and deceleration in the manner aforementioned, that no appreciable resistance will be offered by this member to the closing of the contact members. However, it is apparent that a sudden movement of the rocker arm will cause the rocker arm extension 15' to strike the opposite end of the slot and, due to the large inertia of the inertia member, the rocker arm may be caused to stop in a predetermined position such as a neutral position with both contact members disengaged. This avoids inadvertent closing of the opposite contact members on reaching the critical speed point, when it is desired that the opening of one pair of contacts shall not be followed instantly by the closing of the opposite pair.

Although specific embodiments of the invention have been illustrated and described, it will be apparent that various alterations in the details of construction may be made without departing from the scope of the invention as indicated by the appended claims.

What I claim is:—

1. A relay of the character described comprising a driving member adapted to be geared to a member to be controlled, an arm pivotally mounted adjacent said driving member, a rotatable shaft carried by said arm, a driven member mounted on said shaft and adapted to be driven by said driving member, a switch operating member carried by said arm and operable on movement thereof, a fan carried by said shaft, and means resisting pivotal movement of said arm.

2. A relay of the character described comprising a driving member adapted to be geared to a member to be controlled, an arm pivotally mounted adjacent said driving member, a rotatable shaft carried by said arm, a driven member mounted on said shaft and adapted to be driven by said driving member, a switch operating member carried by said arm and operable on movement thereof, a flywheel carried by said shaft, and means resisting pivotal movement of said arm.

3. A relay of the character described comprising a driving member adapted to be geared to a member to be controlled, an arm pivotally mounted adjacent said driving member, a rotatable shaft carried by said arm, a driven member mounted on said shaft and adapted to be driven by said driving member, a switch operating member carried by said arm and operable on movement thereof, a fan and flywheel carried by said shaft, and means resisting pivotal movement of said arm.

4. A relay of the character described comprising a driving member adapted to be geared to a member to be controlled, an arm pivotally mounted adjacent said driving member, a rotatable shaft carried by said arm, a driven member mounted on said shaft and adapted to be driven by said driving member, a switch operating member carried by said arm and operable on movement thereof in the direction of rotation of said driving member, means carried by said shaft for causing said driven member to accelerate or decelerate at a different rate than said driving member, and means resisting pivotal movement of said arm.

5. A relay of the character described comprising a driving member adapted to be geared to a member to be controlled, an arm pivotally mounted adjacent said driving member, a rotatable shaft carried by said arm, a driven member mounted on said shaft and adapted to be driven by said driving member, switch operating elements carried at opposite sides of said arm and operable on the movement thereof in either direction, means carried by said shaft for causing said driven member to accelerate or decelerate at a different rate than said driving member, and means resisting pivotal movement of said arm.

6. A relay of the character described comprising a driving member adapted to be geared to a member to be controlled, an arm pivotally mounted adjacent said driving member, a rotatable shaft carried by said arm, a driven member mounted on said shaft and adapted to be driven by said driving member, a switch operating member carried by said arm and operable on movement thereof, means carried by said shaft for causing said driven member to accelerate or decelerate at a different rate than said driving member, and means resisting pivotal movement of said arm.

7. A relay of the character described comprising a driving member adapted to be geared to a member to be controlled, an arm pivotally mounted adjacent said driving member, a rotatable shaft carried by said arm, a driven member mounted on said shaft and adapted to be driven by said driving member, a switch operating member carried by said arm and operable on movement thereof, means carried by said shaft for causing said driven member to accelerate or decelerate at a different rate than said driving member, means resisting pivotal movement of said arm, and means for adjusting the last mentioned means.

8. A relay of the character described comprising a driving member adapted to be geared to a member to be controlled, an arm pivotally mounted adjacent said driving member, a rotatable shaft carried by said arm, a driven member mounted on said shaft and adapted to be driven by said driving member, a switch operating member carried by said arm and operable on movement thereof, means carried by said shaft for causing said driven member to accelerate or decelerate at a different rate than said driving member, and a spring joining said arm to a fixed support and adapted to resist pivotal movement of said arm.

9. A relay of the character described comprising a driving member adapted to be geared to a member to be controlled, an arm pivotally mounted adjacent said driving member, a rotatable shaft carried by said arm, a driven member mounted on said shaft and adapted to be driven by said driving member, a switch operating member carried by said arm and operable on movement thereof, means carried by said shaft for causing said driven member to accelerate or decelerate at a different rate than said driving member, a spring joining said arm to a fixed support and adapted to resist pivotal movement of said arm, and means for adjusting said spring.

10. A relay of the character described comprising a driving member adapted to be geared to a member to be controlled, an arm pivotally mounted adjacent said driving member, a rotatable shaft carried by said arm, a driven member mounted on said shaft and in frictional contact with said driving member, a switch operating member carried by said arm and operable on movement thereof, and means carried by said shaft for causing said driven member to accelerate or decelerate at a different rate than said driving member.

11. A relay of the character described comprising a driving member adapted to be geared to a member to be controlled, an arm pivotally mounted adjacent said driving member, a rotatable shaft carried by said arm, a driven member mounted on said shaft and in frictional contact with said driving member, a switch member carried by said arm and operable on movement thereof, and means carried by said shaft for causing said driven member to accelerate or decelerate at a different rate than said driving member, and means for adjusting the frictional relation between said driving and driven members.

12. A relay of the character described comprising a driving member adapted to be geared to a member to be controlled, an arm pivotally mounted adjacent said driving member, a rotatable shaft carried by said arm, a driven member mounted on said shaft and adapted to be driven by said driving member, switch operating elements carried at opposite sides of said arm and operable on the movement thereon in either direction, means carried by said shaft for causing said driven member to accelerate or decelerate at a different rate than said driving member, and means for retarding reversal of the direction of said arm.

13. A relay of the character described comprising a driving member adapted to be geared to a member to be controlled, an arm pivotally mounted adjacent said driving member, a rotatable shaft carried by said arm, a driven member mounted on said shaft and adapted to be driven by said driving member, switch operating elements carried at opposite sides of said arm and operable on the movement thereof in either direction, means carried by said shaft for causing said driven member to accelerate or decelerate at a different rate than said driving member, an inertia member movably mounted adjacent said arm, and a loose connection between said member and arm.

In testimony whereof I affix my signature.

MACKWORTH G. REES.